United States Patent
Rao et al.

(10) Patent No.: US 11,933,159 B2
(45) Date of Patent: Mar. 19, 2024

(54) SYSTEM AND METHODS FOR DEVELOPING AND DEPLOYING OIL WELL MODELS TO PREDICT WAX/HYDRATE BUILDUPS FOR OIL WELL OPTIMIZATION

(71) Applicant: AspenTech Corporation, Bedford, MA (US)

(72) Inventors: Ashok Rao, Sugar Land, TX (US); Pedro Alejandro Castillo Castillo, Houston, TX (US); Hong Zhao, Sugar Land, TX (US); Mir Khan, Houston, TX (US); Magiel J. Harmse, Houston, TX (US)

(73) Assignee: AspenTech Corporation, Bedford, MA (US)

( * ) Notice: Subject to any disclaimer, the term of this patent is extended or adjusted under 35 U.S.C. 154(b) by 552 days.

(21) Appl. No.: 17/214,160

(22) Filed: Mar. 26, 2021

(65) Prior Publication Data

US 2021/0301644 A1  Sep. 30, 2021

Related U.S. Application Data

(60) Provisional application No. 62/994,936, filed on Mar. 26, 2020.

(51) Int. Cl.
*E21B 37/00* (2006.01)
*E21B 37/06* (2006.01)
(Continued)

(52) U.S. Cl.
CPC ............. *E21B 47/006* (2020.05); *G06N 5/04* (2013.01); *G06N 20/00* (2019.01); *E21B 2200/20* (2020.05)

(58) Field of Classification Search
CPC ............... E21B 47/006; E21B 2200/20; E21B 2200/22; E21B 47/806; E21B 2200/29;
(Continued)

(56) References Cited

U.S. PATENT DOCUMENTS

| | | | | |
|---|---|---|---|---|
| 4,994,671 A | * | 2/1991 | Safinya | E21B 49/088 |
| | | | | 250/339.05 |
| 5,083,452 A | * | 1/1992 | Hope | G01N 29/449 |
| | | | | 73/61.49 |

(Continued)

FOREIGN PATENT DOCUMENTS

| | | |
|---|---|---|
| WO | 2019222129 A1 | 11/2019 |
| WO | 2021/195547 A1 | 9/2021 |

OTHER PUBLICATIONS

International Search Report and Written Opinion for International Application No. PCT/US2021/024452, entitled "System and Methods for Developing and Deploying Oil Well Models to Predict Wax/Hydrate Buildups for Oil Well Optimization," dated Jul. 16, 2021.

(Continued)

*Primary Examiner* — Edwin J Toledo-Duran
(74) *Attorney, Agent, or Firm* — Hamilton, Brook, Smith & Reynolds P.C.

(57) ABSTRACT

A method and system for estimating wax or hydrate deposits is desirable for the oil industry and important for assuring flow conditions and production, avoiding downtime, and reducing or preventing costly interventions. The method and system disclosed herein use artificial intelligence and machine learning techniques combined with oil well historical operational sensor data and historical operational event records (such as diesel hot flush, slick line, coil tubing, etc.) to build an oil well model. The method and system enable oil well practitioners to test and validate the built model and deploy the model online to estimate and/or detect wax or (Continued)

hydrate deposition status. By using one or more such models in operating an oil well, users can monitor and/or detect the status of wax of hydrate deposits in an oil well and can optimize production, maintenance, and planning for oil wells.

17 Claims, 17 Drawing Sheets

(51) Int. Cl.
  *E21B 47/00* (2012.01)
  *G06N 5/04* (2023.01)
  *G06N 20/00* (2019.01)
(58) Field of Classification Search
  CPC .......... E21B 37/00; E21B 37/06; E21B 41/00;
    E21B 49/02; E21B 43/00; E21B 49/0875;
    E21B 49/086; E21B 49/081; G06N 5/04;
    G06N 20/00; G06N 5/025; G06Q 10/067;
    G06Q 50/02; G01V 1/50; G01N 33/2823;
    G01N 30/8693; G01N 2030/025
  See application file for complete search history.

(56) References Cited

U.S. PATENT DOCUMENTS

| | | | | |
|---|---|---|---|---|
| 5,498,875 A * | 3/1996 | Obremski | ............ | G01J 3/4338 356/73 |
| 6,042,715 A * | 3/2000 | Calange | ................. | E21B 49/00 208/309 |
| 6,176,323 B1 * | 1/2001 | Weirich | ................... | E21B 21/08 175/40 |
| 6,388,251 B1 * | 5/2002 | Papanyan | .......... | G01N 21/8507 250/269.1 |
| 6,437,326 B1 * | 8/2002 | Yamate | ................... | E21B 49/08 250/269.1 |
| 7,966,273 B2 * | 6/2011 | Hegeman | ................ | E21B 49/10 166/264 |
| 8,760,657 B2 * | 6/2014 | Pope | ...................... | G01N 21/65 250/269.1 |
| 8,867,040 B2 * | 10/2014 | Pope | ....................... | E21B 47/10 250/269.1 |
| 9,460,408 B2 * | 10/2016 | Berlandier | ........... | G06Q 10/067 |
| 2003/0048432 A1 * | 3/2003 | Jeng | ................... | G01N 21/4133 356/326 |
| 2003/0048450 A1 * | 3/2003 | Pope | .................. | G01N 21/8507 356/435 |
| 2004/0045705 A1 * | 3/2004 | Gardner | ................. | E21B 47/00 166/305.1 |
| 2004/0069942 A1 * | 4/2004 | Fujisawa | ............ | G01N 21/3577 250/269.1 |
| 2005/0099618 A1 * | 5/2005 | DiFoggio | ................ | E21B 49/10 356/70 |
| 2005/0242807 A1 * | 11/2005 | Freedman | .............. | G01V 11/00 324/303 |
| 2006/0139646 A1 * | 6/2006 | DiFoggio | ................ | E21B 49/10 356/436 |
| 2006/0142955 A1 * | 6/2006 | Jones | ..................... | G01N 21/27 436/139 |
| 2007/0013911 A1 * | 1/2007 | DiFoggio | ................. | G01J 3/26 356/436 |
| 2007/0143023 A1 * | 6/2007 | Betancourt | .............. | G01N 1/00 702/11 |
| 2011/0119212 A1 * | 5/2011 | De Bruin | ............... | A61B 5/369 706/12 |
| 2012/0166099 A1 * | 6/2012 | Kusinski | ................ | C10G 75/00 702/25 |
| 2014/0256055 A1 * | 9/2014 | Pottorf | ................... | G01V 9/005 324/345 |
| 2021/0222552 A1 * | 7/2021 | Gao | ....................... | G06N 20/00 |
| 2022/0155275 A1 * | 5/2022 | Zuo | .................... | G01N 33/2823 |

OTHER PUBLICATIONS

Xie, Y. and Xing, Y., "A prediction method for the wax deposition rate based on a radial basis function neural network," Petroleum, 3: 237-241 (2017).
International Preliminary Report on Patentability and Written Opinion, International Application No. PCT/US2021/024452, dated Sep. 22, 2022.

* cited by examiner

Machine Learning Agent Wizard - Step 1 of 4

Select Type of Agent to Create

This wizard lets you define a Machine Learning Agent which will be trained on the currently selected data set. Choose the type of agent below; subsequent screens will let you specify other settings.

○ Hidden Failure Detection Agent

A Hidden Failure Detection Agent identifies abnormal data within a training date range. It combines data from multiple sensors, excluding marked failures and offline periods, to identify times with abnormal data. These may indicate known or unknown failures, which can be added to the Failure Library to establish a clean baseline of normal behavior for other agents.

Failure Signature Recognition Agent

○ Standard

A Failure Agent learns a signature from one or more selected failures within a training date range, which should also include times with normal data. The trained agent can be verified against holdout data. Once deployed as a live agent, it watches for minuscule, non-human-detectable patterns in sensor data and provides advance warning of recurrences of that failure pattern.

○ Maestro-Enabled

A Maestro-Enabled Failure Agent will automatically determine the key sensors to use for training based on your selected sensor group. Maestro-Enabled Failure Agents benefits also include automated selection of failure items and normal data time ranges to be used in training, and an automatic determination of pre-failure intervals. Maestro-Enabled sensor roles can be identified as those with non-zero contributions in the Sensor Rank view.

● [Oil Well Optimization]

A "Maestro-Enabled" agent to determine a relative measure of blockage due to wax and hydrates inside a gas-lift oil well based on historical operational and cleaning event data.

○ Anomaly Detection Agent

An Anomaly Detection Agent learns signatures of normal data within a training date range, which should include variations covering all normal behavior. The trained agent can be verified against holdout data. Once deployed as a live agent, it watches for deviations from the established baseline of normal behavior and warns of developing anomalies.

[ < Back ]  [ Next > ]  [ Cancel ]

FIG. 2A

Machine Learning Agent Wizard - Step 2 of 4

Select Assets For Training

Select assets to be used for learning. Note that for a Failure Agent, there must be at least one asset with a Hidden Failure Detection Agent, and there should be at least one asset with one or more known failures. Unselected assets will still be available for viewing results.

☐ Select All

| Select | Asset ID | Asset Name | Data Start | Data End | Events in Range | Failures in Range |
|---|---|---|---|---|---|---|
| ☐ | W1 | Well 1 | 1/1/2018 12:00:00 AM | 12/27/2018 11:50:00 PM | 22 | 0 |
| ☐ | W2 | Well 2 | 1/1/2018 12:00:00 AM | 12/27/2018 11:50:00 PM | 29 | 0 |
| ☐ | W3 | Well 3 | 1/1/2018 12:00:00 AM | 12/27/2018 11:50:00 PM | 17 | 0 |
| ☐ | W4 | Well 4 | 1/1/2018 12:00:00 AM | 2/23/2020 10:30:00 PM | 34 | 0 |
| ☐ | W5 | Well 5 | 1/1/2018 12:00:00 AM | 10/25/2018 11:50:00 PM | 31 | 0 |
| ☐ | W6 | Well 6 | 1/1/2018 12:00:00 AM | 10/25/2018 11:50:00 AM | 36 | 0 |

☑ Exclude Offline Intervals

⚠ Please choose at least one asset that has a Hidden Failure Detection Agent.

[< Back] [Next >] [Cancel]

FIG. 2B

Machine Learning Agent Wizard - Step 3 of 4

Select Cleaning Events and Training Date Ranges
Identify which cleaning events you want to use to train the agent. Then, set the training date ranges and any exclusion that may apply.

Event Work Items

| Event ID | Asset ID | Problem Code | Cause | Stage | Time of Event | Pre-Failure ... | Post-Failur ... | Unit | Title |
|---|---|---|---|---|---|---|---|---|---|
| F89 | W2 | DHF | | N/A | 2/25/2019 4:21:00 PM | 7200.00 | 4320.00 | MINUTE(S) | Hot flush |
| F88 | W1 | SLK | | N/A | 2/24/2019 4:16:00 PM | 7200.00 | 4320.00 | MINUTE(S) | Slick line |
| F58 | W2 | DHF | | N/A | 2/22/2019 4:23:00 PM | 7200.00 | 4320.00 | MINUTE(S) | Hot flush |
| F57 | W2 | SLK | | N/A | 1/30/2019 9:23:00 AM | 7200.00 | 4320.00 | MINUTE(S) | Slick line |
| F86 | W2 | DHF | | N/A | 1/19/2019 5:16:00 AM | 7200.00 | 4320.00 | MINUTE(S) | Hot flush |
| F55 | W1 | DHF | | N/A | 1/19/2019 12:23:00 AM | 7200.00 | 4320.00 | MINUTE(S) | Hot flush |

Training Date Ranges

[Add Exclusion Range] [Delete Selected Ranges]

| Asset ID | Asset Name | Range Type | Training Start | Training End | Duration | Events In Range | Failure In Range |
|---|---|---|---|---|---|---|---|
| W1 | Well 1 | Training | 1/1/2018 12:00:00 AM | 7/1/2018 12:00:00 AM | 6 Months | 11 | 0 |
| W2 | Well 2 | Training | 1/1/2018 12:00:00 AM | 7/1/2018 12:00:00 AM | 6 Months | 16 | 0 |

[Sensor Data Advanced Settings]

[< Back] [Next >] [Cancel]

Advanced Maestro Model Build Settings

| Parameter Name | Value | UOM | Lower Bound | Upper Bound |
|---|---|---|---|---|
| Termination criteria - Maximum time limit | 20 | minutes | 5 | 10000 |
| Termination criteria - Maximum number of iterations | 100 | NA | 1 | 100000 |
| Training set - Maximum percent of events for training | 30 | % | 1 | 100 |
| Training set - Maximum percent of normal data for training | 50 | % | 30 | 100 |
| Past data - Rolling lookback window factor | 2 | NA | 0 | 5 |
| Past data - Consider offline data within the rolling lookback window as missing | True | True/False | NA | NA |
| Data scaling - Scaling approach | 1 | NA | 0 | 1 |
| State identification - Run state identification step | True | True/False | NA | NA |
| State identification - Feature selection index | 0.6 | NA | 0 | 1 |
| State identification - Probability threshold for normal behavior | 0.3 | NA | 0 | 0.4 |
| State identification - Probability threshold for abnormal behavior (events) | 0.5 | NA | 0.4 | 1 |
| State identification - Maximum duration for the onset of an event | 6.00:00:00 | d.hh:mm:ss | 2.00:00:00 | 30.00:00:00 |
| State identification - Minimum duration of significant events | 2.00:00:00 | d.hh:mm:ss | 0.01:00:00 | 30.00:00:00 |

Cancel  Save

FIG. 2E

SYSTEM AND METHODS FOR DEVELOPING AND DEPLOYING OIL WELL MODELS TO PREDICT WAX/HYDRATE BUILDUPS FOR OIL WELL OPTIMIZATION

RELATED APPLICATION

This application claims the benefit of U.S. Provisional Application No. 62/994,936, filed on Mar. 26, 2020. The entire teaching of the above application is incorporated herein by reference.

BACKGROUND OF THE INVENTION

There are more than 900,000 active oil and gas wells in the United States. More than 130,000 have been drilled since 2010. Most (96%) of the oil wells in the US require artificial lift. The two main categories of artificial lift are pumping systems and gas lift. Most gas lift wells are operated with continuous flow. For example, gas is injected continuously into the production conduit and mixes with the produced well fluid to decrease the density and the flowing bottom hole pressure thereby creating a pressure differential that allows the fluid to flow into the wellbore.

Wax deposition and hydrate buildup is one of the most challenging flow assurance issues in oil production processes [1]. The related problems span from reservoirs to refineries, but their consequences can be particularly challenging when the affected area is difficult to reach, such as producing wells and specifically, offshores. The wax deposition in the areas adjoining the bore, the bore face, the tubing string and the pump is the result of the cooling effect, which occurs when the oil flows from the high-pressure reservoir into the wellbore to the surface. During depressurization, the oil expands and heat is drawn from the oil. The loss of heat leads to a decrease in temperature, which induces crystallization of the wax and subsequent plugging of the well. In this case, wax deposition leads to the decrease of well flow rates and eventually causes total blockage.

Current practice in the oil industry is repeated, periodic wax removal. The methods and technologies frequently used include mechanical removal, heating with hot oil circulation and hot water circulation, and chemical inhibition by use of solvents and dispersants, etc. Nevertheless, all methods used are costly and cannot adequately resolve wax/hydrate buildup.

SUMMARY

A system and method for modeling and predicting the wax/hydrate deposition status of a production oil well is desirable to support maintenance planning and improve the cost-effectiveness of oil production.

Recent advances in research and application of artificial intelligence (AI) and machine learning (ML) provide good opportunities [2] to help address this issue. The system and method described herein can assist industrial practitioners to build and deploy models of an oil well by using historical operation data. The system and method enable users to predict and estimate the wax/hydrate deposition conditions of one or more oil wells. Based on the status of each oil well, the users can improve maintenance planning and optimize oil well production by reducing oil well shutdowns, decreasing maintenance cost, and prolonging operation.

Embodiments described herein assist with oil well production by modeling and predicting wax/hydrate deposition status. The embodiments build and deploy online scalable oil well process models (e.g., regression models, machine learning models, statistical models, and such) for estimating oil well wax and hydrate deposition status in an oil well.

One embodiment described herein is a computer-implemented method for estimating wax or hydrate deposition in an oil well.

Another embodiment is directed to a computer system for estimating wax or hydrate deposition in an oil well. The computer system includes a processor and a memory with computer code instructions stored thereon, the processor and the memory, with the computer code instructions, being configured to cause the system to perform the methods described herein.

Another embodiment is directed to a non-transitory computer program product for estimating wax or hydrate deposition in an oil well. The computer program product includes a computer-readable medium with computer code instructions stored thereon, the computer code instructions being configured, when executed by a processor, to cause an apparatus associated with the processor to perform the methods described herein.

A dataset is generated by loading one or more sets of oil well historical sensor measurement data, each set of oil well historical sensor measurement data comprising measurements related to an attribute of the oil well, and one or more sets of oil well historical event data, each set of oil well historical event data comprising date and time duration related to events of the oil well. The generated dataset is cleansed by identifying and removing measurements that are invalid in quality for modeling wax or hydrate deposition in the oil well. The cleansed dataset is enriched by deriving one or more feature variables and corresponding values based on measurements of oil well sensor variables, whereby enriching adds the values of the one or more derived feature variables to the cleansed dataset. Groups of highly correlated inputs are identified by performing cross-correlation analysis on the enriched dataset, each identified group of highly correlated inputs comprising one or more of: measurements of a subset of the sensor variables and values of derived feature variables in the cleansed and enriched dataset. Feature selection is performed using one representative input from each identified group of highly correlated inputs and outputting results to a sub-dataset. Data clusters are identified and labeled using a machine learning unsupervised data clustering algorithm, thereby generating a dataset containing normal data ranges and events data for model building. Highly correlated sensors for oil well operation state identification are removed. Normal data ranges and state conditions are determined from clustered data. Partial least square (PLS) models are built for operation state identification. Events are identified and labeled from the built PLS models and thresholds. In iterations, the dataset is split into a training dataset and a testing dataset, an oil well model is built and trained using the training sub-dataset, the quality of the model is evaluated using the testing sub-dataset, and the model is stored when a termination criterion is met. The built and trained oil well model is executed to estimate wax or hydrate deposition in the oil well based on real-time oil sensor data.

The oil well historical sensor measurement data can include lift gas flow rate, lift gas casing pressure, lift gas casing temperature, production tubing pressure, production tubing temperature, or inner annulus pressure.

The oil well historical event data can include one or more of diesel hot flush, slick line, and coil tubbing.

Loading can further include loading one or more user-specified settings.

The method can further include scaling the generated data, wherein scaling is performed after cleansing and prior to enriching.

The machine learning unsupervised data clustering algorithm comprises a K-means algorithm, a Density-Based Spatial Clustering of Applications with Noise (DB SCAN) algorithm, or a Local Outlier Factor (LOF) algorithm.

Removing highly correlated sensors for oil well operation state identification can further include calculating Pearson product-moment correlation coefficients between sensors.

Removing highly correlated sensors for oil well operation state identification can further include summing coefficients across all other sensors and comparing with a pre-defined threshold value.

Removing highly correlated sensors for oil well operation state identification can further include removing the sensors with highest summed absolute values of correlation coefficients.

Removing highly correlated sensors for oil well operation state identification can further include keeping remaining sensors with least correlations.

Determining normal data ranges and state conditions from clustered data can further include deriving time ranges and state conditions from clustered data and thresholds.

Determining normal data ranges and state conditions from clustered data can further include a fine-tuning duration of state conditions and events.

Splitting the dataset into a training dataset and a testing dataset according the data ranges and events data can further include assigning model output value as "0" for normal operation condition and as "1" during potential events.

Executing the built and trained oil well model and estimating wax or hydrate deposition status in the oil well based on real-time oil sensor data can further include reading real-time sensor data, cleaning, scaling, and enriching the real-time sensor data, executing PLS model online calculations and sending output values to a user interface.

The built and trained oil well model can adjust operation of the oil well.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A illustrates an example user interface for selecting the oil well optimization agent (modeling) in the method of FIG. 1A.

FIG. 2B illustrates an example user interface for selecting the oil well for model building in the method of FIG. 1A.

FIG. 2C illustrates an example user interface for selecting the oil well data range for model building in the method of FIG. 1A.

FIG. 2D illustrates an example user interface for selecting the agent (model) name, description, and sensor group for an oil well model to build in the method of FIG. 1A.

FIG. 2E illustrates an example user interface for selecting advanced settings for model building in the method of FIG. 1A.

DETAILED DESCRIPTION OF THE INVENTION

A description of example embodiments follows. In general, the embodiments relate to a system and method for modeling and predict the wax/hydrate deposition status of an oil well (e.g., a production oil well), which is desirable to support maintenance planning and improve the cost-effectiveness of oil production.

Overview of Oil Wells

Figure 5:
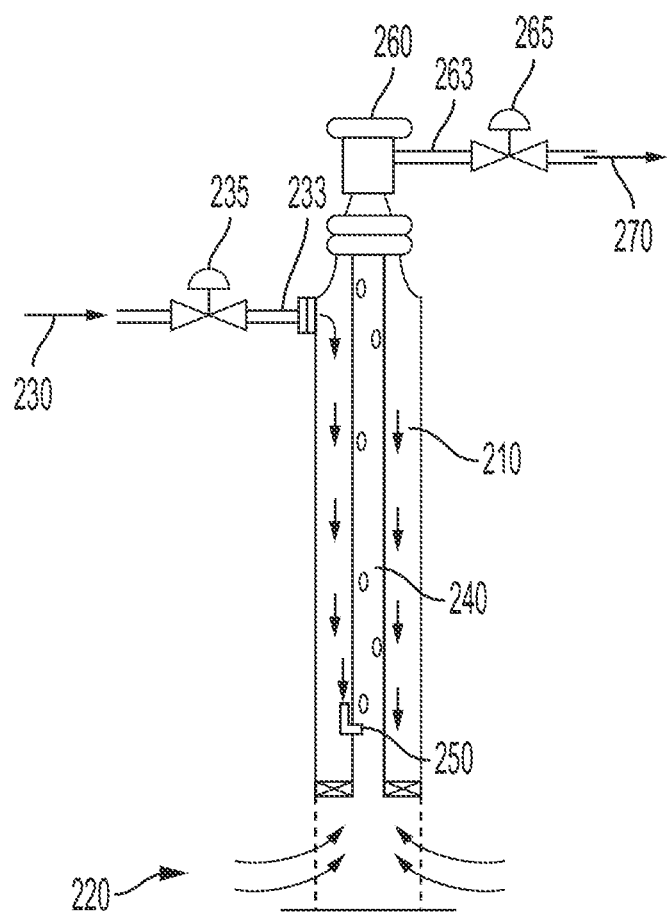
FIG. 5 illustrates a gas lift oil well.

FIG. 5 is a schematic of a gas lift oil well 200. A well bore defines an annulus 210 extending from the surface to a reservoir of oil 220. A lift gas is injected into the oil well 200 at a gas inlet 230. A valve, or choke, 235 is typically used to control the flow rate of the lift gas. The lift gas in the lift gas casing 233 has attributes, including a flow rate, casing pressure, casing temperature, and molecular composition. Lift gas is injected at the gas inlet and enters into the tubing 240 of the oil well at one or more injection valves 250, thereby causing the oil to flow upwards toward an outlet 260. A valve, or choke, 265 is typically used to control the flow of oil out to the outlet 270. the oil well 200. Production tubing 263 has attributes, including a tubing temperature and tubing pressure. The injected gas mixes with the produced well fluid to decrease the density and the flowing bottom hole pressure thereby creating a pressure differential that allows the fluid to flow into the wellbore.

Wax deposition and hydrate buildup is one of the most challenging flow assurance issues in oil production processes. It leads to the decrease of well flow rates and eventually causes total blockage. However, in industrial practices, the current techniques and methods to identify wax deposit in oil well operation are still developing. Existing direct methods include using direct sensors to measure oil production flow, pressure difference between the oil well bottom (reservoir) and outlet, etc., but only large-scale wax deposit can be detected. Existing indirect methods to measure wax thickness on the walls of an oil well include: pressure drop method (most common), with a disadvantage of inaccuracy due to multiphase flow; heat transfer method, with disadvantages of inaccuracies due to multiphase flow and certain flow patterns; pressure wave propagation technique, with a disadvantage of difficulty generating powerful signals to overcome the large signal attenuation.

Given the limitation of existing methods, a system and method able to detect smaller or incipient deposits is desirable for oil industry and critical for assuring flow conditions and production in the long run and avoiding downtime and preventing costly interventions.

Overview of Method of Building and Deploying Oil Well Models

Figure 1A:
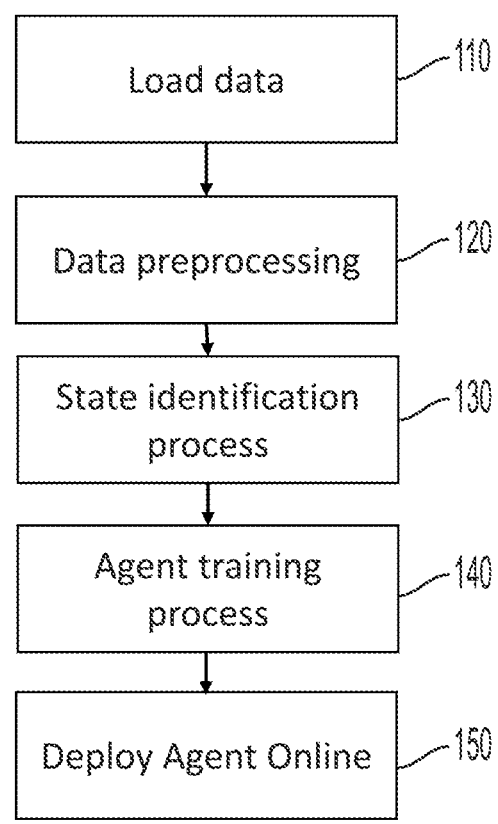
FIG. 1A is a flowchart depicting an example system and method for building and deploying an oil well model to monitor and estimate wax deposit.
Figure 1B:
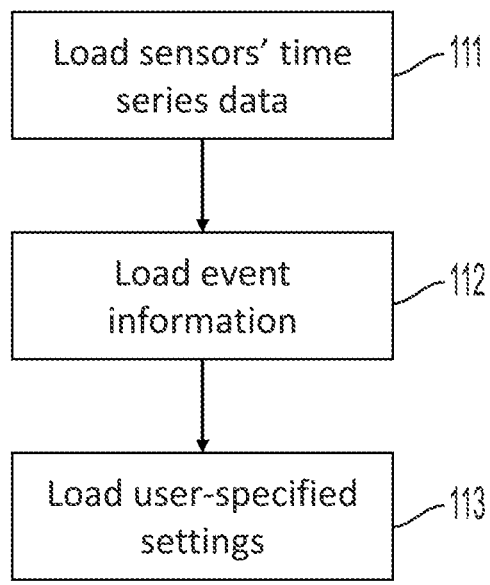
FIG. 1B is a flowchart depicting an example system and method for loading oil well operation data and event information in the method of FIG. 1A.
Figure 1C:
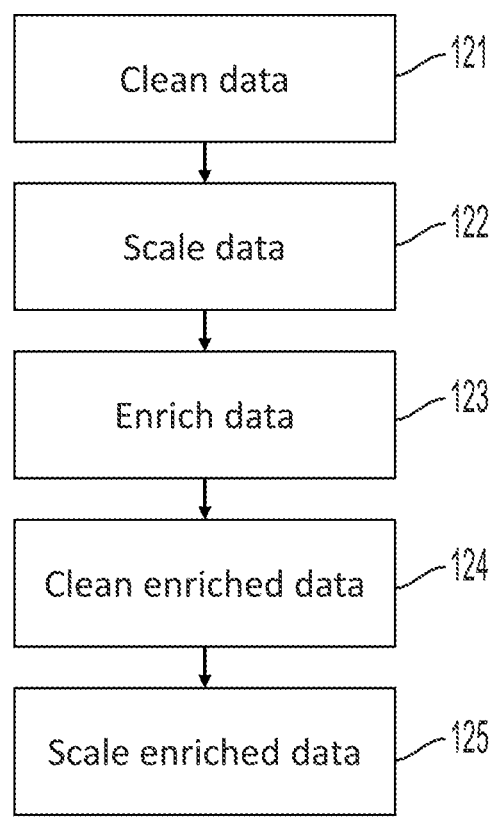
FIG. 1C is a flowchart depicting an example method of performing data cleansing, data enrichment and data scaling in the method of FIG. 1A.
Figure 1D:
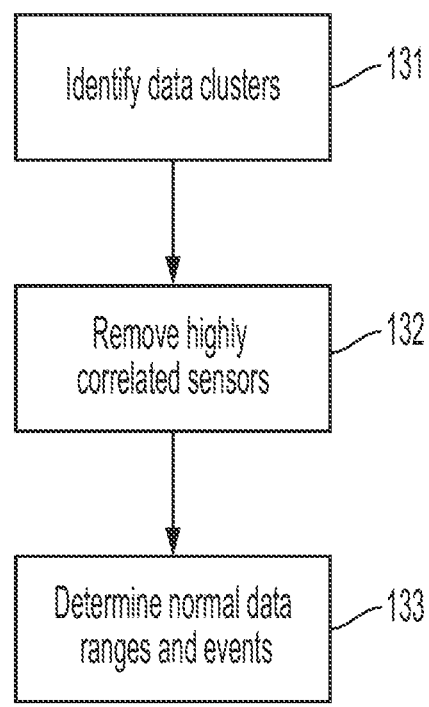
FIG. 1D is a flowchart depicting an example method of performing state identification in the method of FIG. 1A.
Figure 1E:
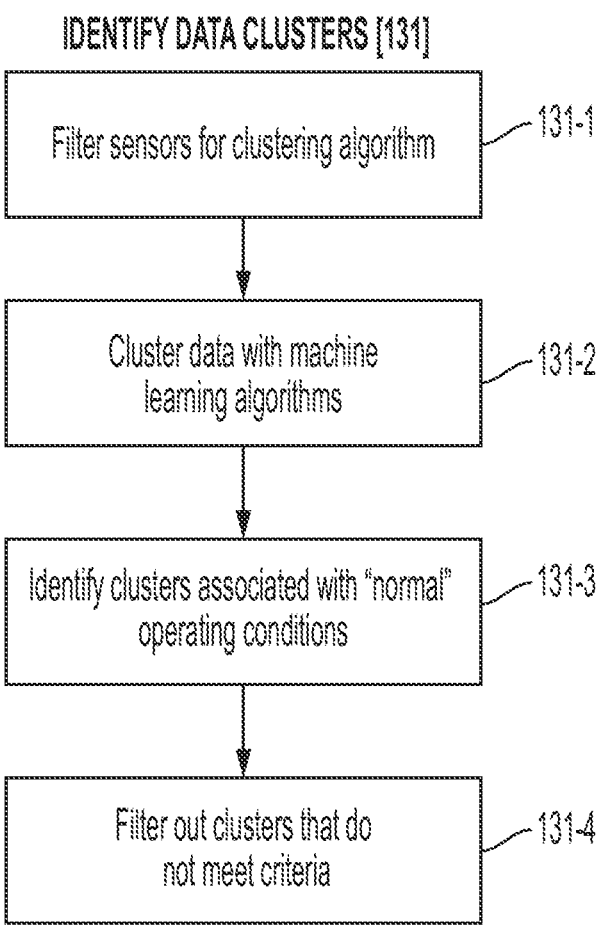
FIG. 1E is a flowchart depicting an example method of identifying data clusters in the method of performing state identification of FIG. 1D.

FIG. 1A illustrates an example method 100 of an overall workflow for building and deploying an oil well model for estimating, optionally provided online via the Internet, wax deposition of one or more oil wells (e.g., production oil wells). To build the oil well model, the method 100 loads and generates a dataset to be used as input to the model. The dataset contains recorded historical sensor measurements for the oil well, and thus the historical sensor measurements are real-world data regarding an oil well. To generate output dataset for the model, the method 100 also loads oil well operation events information and converts those events information into "0" and "1" values based on specific rules. The success of the oil well model in estimating wax deposit accumulation, detecting blockage, and optimizing maintenance planning is based on the effectiveness of method 100 to select for the dataset key process variables used as input to the oil well model.

The embodiments use an automated approach for data loading including:
1) loading oil well historical sensor measurement data, for example, Lift gas flow rate, Lift gas casing (233) pressure, Lift gas casing (233) temperature, Production tubing (263) pressure, Production tubing (263) temperature, Inner annulus pressure and such;
2) loading oil well historical event data, such as Diesel hot flush (code DHF) with date and time duration, Slick line (code SLK) with date and time duration, Coil tubing (code CTB) with date and time duration, etc.;
3) preprocessing data, including data cleaning, feature engineering of process variable inputs, enriching input variables, and scaling the enriched data; and optimal selection of inputs for oil wax deposition models;
4) portioning cleaned dataset and generating several sub-datasets for normal oil well production with no wax blockage (such as the production period after a wax cleaning), pre-failure period (such as wax deposition in cumulation), a failure period (oil well lockage happened) and post-failure period (wax cleaning with hot oil, etc.);
5) identifying and adjusting onset of each event on historical oil well operation data and wax cleaning log date.

To generate the sub-datasets, the embodiments begin by loading available measured inputs (oil well historical measurement data) for measurable process variables of the oil well operational database. The loaded available measured inputs comprise an original (raw) input dataset, often including Lift gas flow rate, Inner annulus pressure, Production tubing (263) pressure, Lift gas casing (233) pressure, Production tubing (263) temperature, Lift gas casing (233) temperature, and such. In addition, the loaded dataset also contain oil well maintenance records (oil well historical event data) such as Hot flushes, Slick line interventions, Coil tubing interventions, etc.

The embodiments then provide an approach by first performing feature engineering using the available measured inputs of the dataset to derive feature variables and corresponding values (feature inputs). Through the feature engineering, the embodiments generate an enriched input dataset from the original input dataset. To do so, the embodiments apply an automated data enrichment procedure to derive the feature inputs from the measured inputs in the raw input dataset, which are added to the original input dataset.

The embodiments also provide input-output model fitting analytics to test and drop from the enriched input dataset from measured inputs and/or derived feature inputs that show no or relatively less correlations with an oil wax deposition. As a result, the embodiments provide results with a reduced input dimension on the original input dataset through multiple techniques.

In this approach, the embodiments may first cleanse poor quality (invalid) data segments and measurements for missing and invalid measurements from the original raw input dataset. For example, these embodiments may apply the automated data screening and slicing technique described in U.S. Pat. No. 9,141,911 B2, which is incorporated herein by reference in its entirety.

Secondly, the embodiments may scale the dataset by using standard statistical mean or median (depending on the measurements data distributions) and standard deviation (STD) for each sensor variable.

The embodiments then enrich the input space (the original raw dataset) using feature engineering, which generates values for one or more derived feature variables possibly more predictable to a target events than values for measured input variables. The embodiments derive the feature variables and corresponding values (inputs) either based on physical principles or numerical transforms, for example, by applying a logarithm transform to values of a measurable input variable (measured input) of the dataset, or calculating a new input variable using a math equation on one or more measured input of the dataset, for example, temperature difference of two measurement points, pressure difference of two measurement points, etc. The derived feature inputs are then added to the dataset and together with the measured inputs form an enriched dataset.

The embodiments further clean and scale the enriched dataset by using standard statistical methods.

The embodiments next perform oil well state identification process. Artificial intelligence and machine learning data clustering algorithm, such as K-means clustering is applied to the enriched dataset and the enriched dataset is clustered and labeled as several clusters, each of which showing similar "oil well behaviors".

Further, the embodiments perform cross-correlation analysis among all inputs of the enriched dataset, including both the measured and derived feature inputs. The cross-correlation analysis identifies highly correlated inputs of the dataset and groups them to limit these highly-correlated (redundant) inputs from all being selected as final inputs to the oil well model.

The embodiments apply a partial least square (PLS, also referred to as Projection-to-Latent-Structure) technique to build an oil well event model based on the clustered dataset. To prepare the model training, model input variables and model output are selected by the following consideration and assumptions: The largest data cluster is considered to correspond to normal oil well operating conditions. The remaining clusters are assumed to be other states. From those clusters, data ranges that are longer than a minimum duration (in this case 1 hour) are considered potential events. Assigning the value of a state output variable as "0" for normal operation data clusters and a value of "1" for an event.

The embodiments further adjust onset of each event, special rules based on assumed minimum durations for an oil well event counted in the modeling apply to the dataset. After adjusting of starting time and duration of each identified event, the embodiments move to oil well model training steps.

The embodiments use the resulting enriched input sub-dataset and defined event output values for building and training an oil well model with improved predictable capability to estimate an oil well's wax deposition status. For example, the embodiments may (i) use the enriched sub-dataset containing values of measurable process variables and derived feature variables as inputs, (ii) assigned output values of "0" and "1" as normal operation states and event individually, to train an oil well model, the model can be a PLS model, or a deep-learning neural network model. The model training process may include one or more iterations in which the embodiments perform multiple steps (such as splitting data into training and testing sets, selecting features, training a model, run predictions with testing data and assess model quality, etc.). A final model is obtained when the iterations is terminated.

The embodiments then deploy the oil well model online to monitor for the status of oil well wax deposition with real-time oil well data collected by sensors from an operational oil well. The online deployed oil well model can then estimate an oil well's status of wax deposition early by the enriched inputs of the online deployed model to serve for optimum oil well maintenance and wax cleaning planning.

The systems and methods described herein for building an oil well model with artificial intelligence and machine learning techniques and using oil well historical operation sensor data and operational event records (such as Diesel hot flush (code: DHF), Slick line (code: SLK), Coil tubing (code: CTB), etc.); the system and methods further enable oil well practitioners to test and validate the built model and deploy the model online to estimate and detect wax deposition status. By using one or more such models in the oil well operation, the users may monitor the status of wax deposit in each oil well, and further based on the information to optimize their oil production and maintenance planning for multiple oil wells.

The method 100 can also perform further processing or take real-world actions based upon the estimated wax or hydrate deposition. For instance, an example embodiment adjusts operation of an oil well based upon the estimated wax or hydrate deposition, e.g., by decreasing production from the oil well, by stopping production from the oil well, by increasing production from the oil well, by partially or completely opening a valve, or by partially or completely closing a valve. Another example embodiment provides an output signal that adjust operation of an oil well. In some embodiments, the output signal can be received by an online system for further processing.

Load Oil Well Data

The method 100 begins at step 110. The method 100, at step 111, loads oil well historical operations data (historical sensor measurements) for process variables of the oil well from an oil well historian or oil field database. The historical sensor measurements are data regarding real-world operation of an oil well. In other embodiments, the method 100 (step 110) may load (import) operations data (historical sensor measurements) for the oil well variables from other sources, such as other data servers, oil well management systems, or any other resources of the plant or oil field. In yet other embodiments, the operations data may be loaded from a file format, including a spreadsheet file, a text file, a binary file, and such. The loaded operations data includes measurements, preferably periodic or continuous measurements, for a number of process variables (process variable tags) for the oil well. The method 100 (step 111) generates a raw dataset that contains the loaded original operation data for the process variables of the oil well, formatted as a time-series based on timestamps associated with the operations data.

In the embodiments, the method 100, at step 112, further loads oil well historical event data for the oil well as a base to assign (in subsequent steps) specific discrete values (e.g., "0" or "1") to the output of an oil well model to be built. The historical event data represents events that have occurred in an operational oil well. In addition, in the embodiments, the method 100 (step 113) also loads at least one or more user-specified settings for the dataset and model.

Figure 2D:
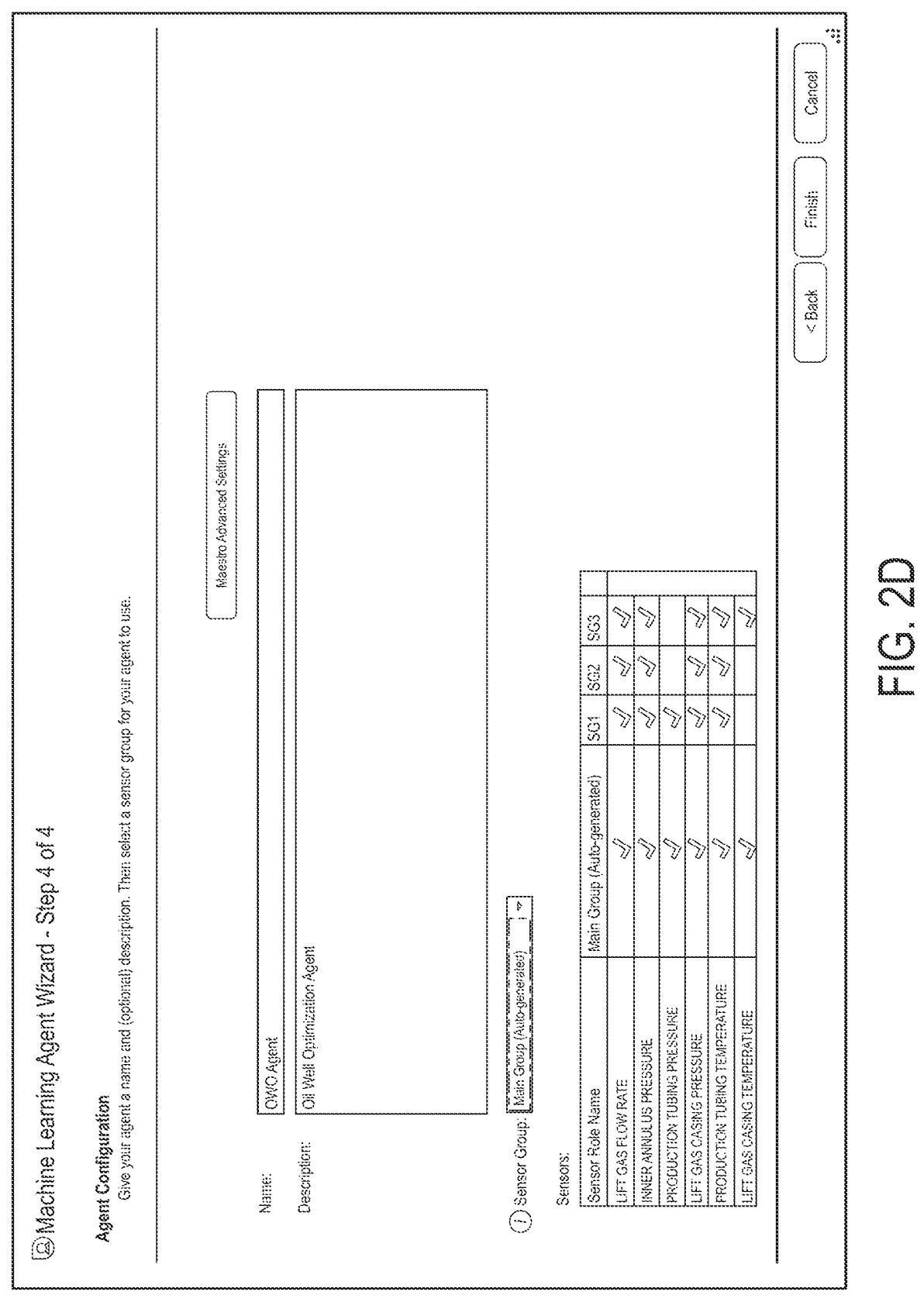

For example, in FIGS. 2A-2E, the method 100 (step 110) may enable a user (e.g., oil well operator, maintenance engineer, and such) to start the model (called "Agent" in software product) building process by selecting an option item shown as "Oil Well Optimization" from a user interface of an application software product. In some embodiments, the method 100 (step 110) may display to the user, through a user interface, as shown in FIG. 2B. The user, through the user interface as shown in FIG. 2B, can view and select an oil well for data loading and model building. In the user interface of FIG. 2B, the oil well has an Asset ID and an associated Asset Name. Optionally, the user interface can display a date and/or time in Data Start and Data End fields. Optionally, the user interface can display the number of oil well historical event data and failures in the date range from the Data Start to the Data End dates. The method 100 (step 110) then allows a user to select data ranges for each selected oil well and to input a name, description, and sensor group for the oil well model, as shown in FIG. 2D. FIG. 2C is an example user interface for selecting data ranges. The method 100 (step 110) loads the historical operation measurements (with associated timestamps) for the selected sensor variables and user-specified data ranges.

Figure 1F:
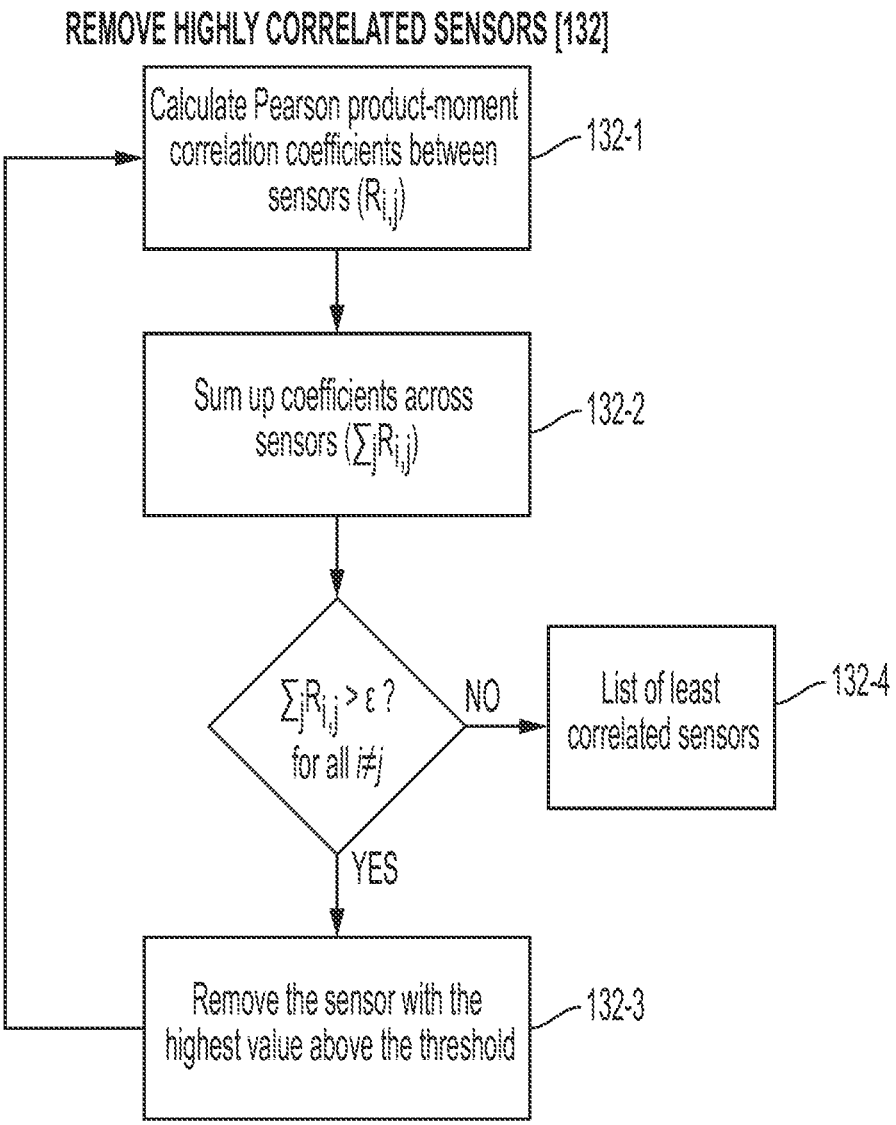
FIG. 1F is a flowchart depicting an example method of removing highly correlated sensors in the method of performing state identification of FIG. 1D.
Figure 1G:
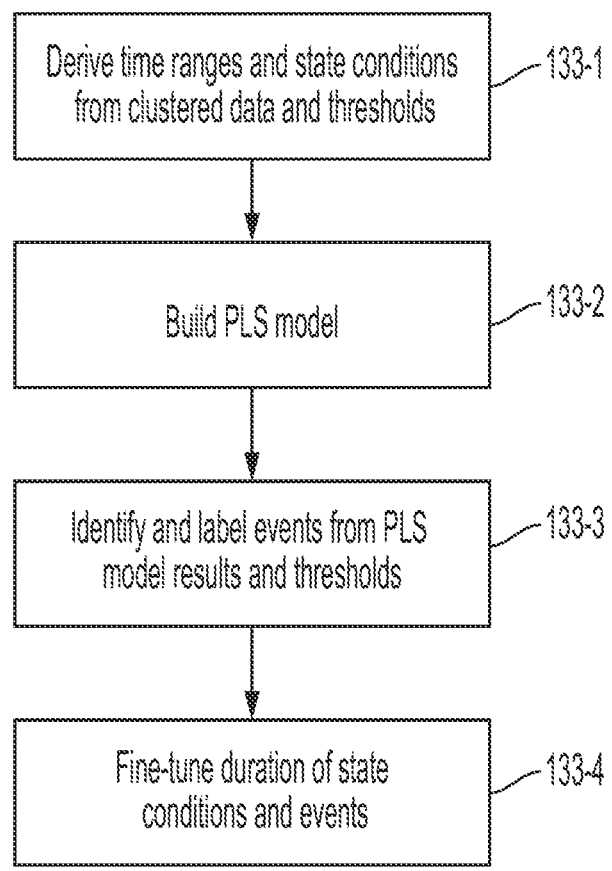
FIG. 1G is a flowchart depicting an example method of determining normal data ranges and events in the method of performing state identification of FIG. 1D.
Figure 1H:
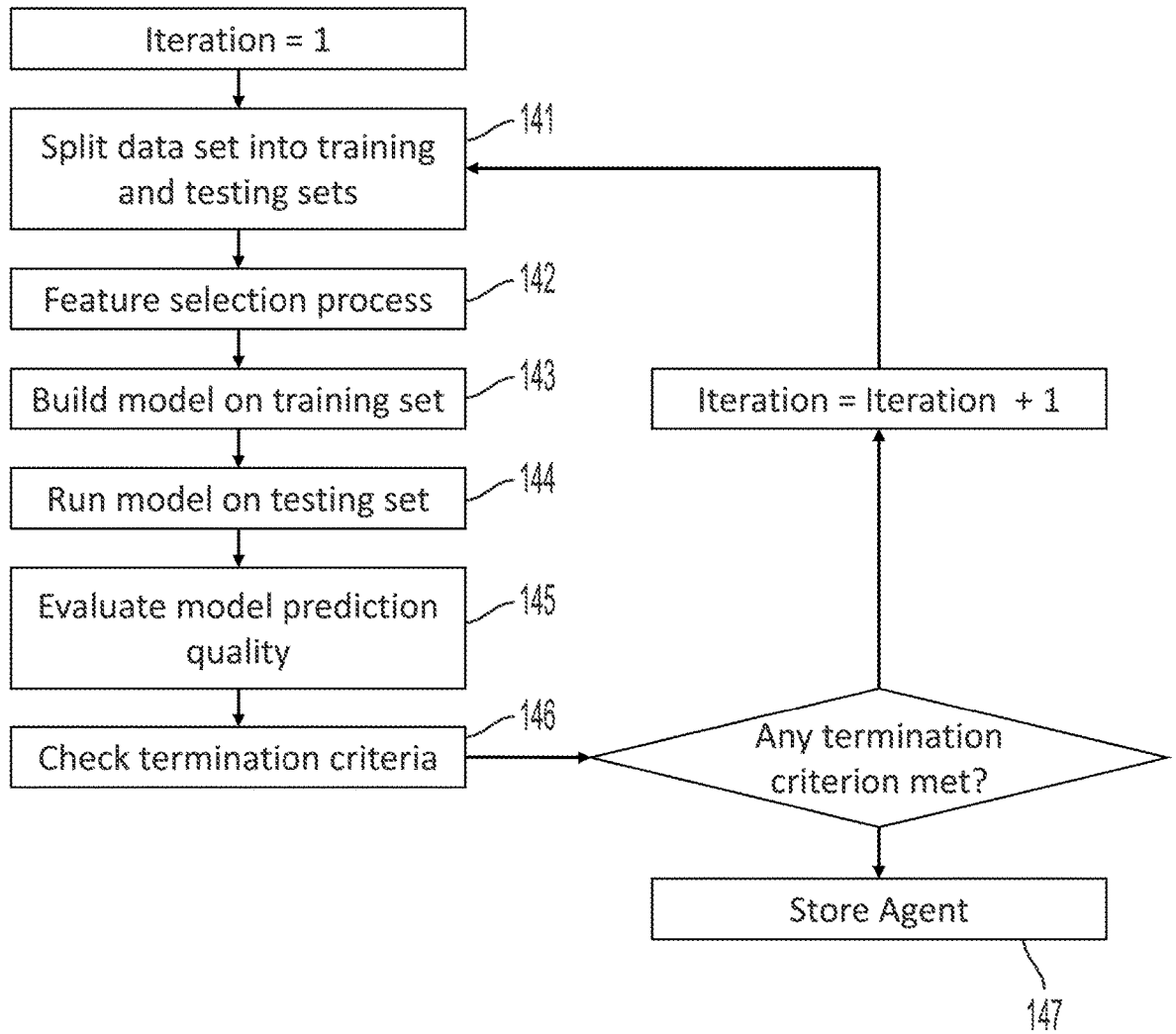
FIG. 1H is flowchart depicting detailed steps of an example method of performing model training in the method of FIG. 1A.

Further, the method 100 (step 110) allows a user to select one or more advanced modeling settings, as shown in FIG. 2E. In general, these user-specified criteria have values, unit of measurement (UOM), lower bound, and upper bound, which are specified by a user or operator. These user-specified settings can include:

termination criteria—maximum time limit; The maximum time allocated to step 140 of method 100. If this time is reached, then the iterative loop stops. Default value: 20 minutes.

termination criteria—maximum number of iterations; The maximum number of iterations allocated to step 140 of method 100. If this number of iterations is reached, then the iterative loop stops. Default value: 100.

training set—maximum percent of events for training; The maximum percentage of events used in training sets (step 141 of method 100). Default value: 50%.

training set—maximum percent of normal data for training; The maximum percentage of data associated with normal operating conditions used in training sets (step 141 of method 100). Default: 30%.

past data—rolling lookback window factor; Number that defines rolling lookback window duration for sensor data transformations during data enrichment step (step 123 of method 100). Default value: 2. This factor multiplies the average event duration to determine the lookback window duration.

past data—consider offline data within the rolling lookback window as missing; If set to True, sensor values corresponding to timestamps on which the equipment can be considered offline (i.e., not operating) are considered as missing data. If set to False, the sensor measured values are retained. Default value: True.

data scaling—scaling approach; If equal to 1, sensor data from each well is scaled with the corresponding sensor mean and sensor standard deviation for that well. If equal to 0, sensor data from each well is scaled with the sensor mean and sensor standard deviation across all wells. Default value: 1.

state identification—run state identification step; If set to True, step 130 of method 100 is executed. If set to False, step 130 of method 100 is skipped. Default value: True.

state identification—feature selection index; Threshold to define high correlation between a pair of sensors (step 132 of method 100; E in FIG. 1F). Default value: 0.6.

state identification—probability threshold for normal behavior; Threshold for PLS model prediction used to identify data ranges associated with normal operating conditions (step 133-3 of method 100). Default value: 0.3.

state identification—probability threshold for abnormal behavior (events); Threshold for PLS model prediction used to identify data ranges associated with abnormal operating conditions (step 133-3 of method 100). Default value: 0.5.

state identification—maximum duration for the onset of an event; Threshold to specify maximum duration of an event (step 133-4 of method 100). Default value: 6 days.

state identification—minimum duration of significant events; Threshold to specify the minimum duration of events that can be considered of interest for the analysis (step 133-3 of method 100). Default value: 2 days.

The method 100, at step 110, generates a raw dataset that contains the loaded operation measurements for the selected candidate process variables of the oil well, formatted as a time-series based on the associated timestamps.

Data Preprocessing

The method 100, at step 120, performs data cleansing and repairing on the dataset generated in step 110. In example embodiments, the method 100 (step 120) applies an automated data screening and slicing technique for identifying and cleansing the generated dataset. In some embodiments, the method 100 (step 120) applies the automated data screening and slicing technique described in U.S. Pat. No. 9,141,911 B2, which is incorporated herein by reference in its entirety.

For each candidate set of oil well historical sensor measurement data, the method 100 (step 120) screens the oil well historical sensor measurement data and identifies measurement data (partial and whole) that is of poor quality (invalid) for modeling an event associated with the oil well. The method 100 (step 120) marks the identified measurement data for possible exclusion from the dataset. Poor quality measurement data for a candidate input variable may be characterized by, but not limited to, missing values (gaps), frozen signals (constant values crossing over a long period), short-term outliers, and values that are out of process in high/low process limits or highly noisy in the continuous measurements of the candidate process variable. The method 100 (step 120) may identify and mark poor quality measurement data of a candidate process variable based on data sample status, recorded value quality, known sensor interruptions, operation downtime, operational high and low limits as well as calculated statistics on the continuous measurement data (as loaded from plant historian database in step 110).

The method 100 (step 120) provides flexibilities to pre-process the marked poor quality measurement values of the dataset with several repair and removal processing options to cleanse these values. In some embodiments, the method 100 (step 121) displays the marked poor quality measurement data to the user, via a user interface, and enables the user to select or confirm cleanse or repair options to apply to the marked measurement data.

In some embodiments, the method 100 (step 121) may repair some or all of the marked poor quality measurement data for the candidate process variables in the dataset. In cases of missing measurement values (gaps) for a candidate process variable, the method 100 (step 121) may fill-in the gaps in the oil well historical sensor measurement data with interpolation. In cases of outliers, gaps, and other poor quality data segments in the measurement data for a candidate process variable, the method 100 (step 121) may apply model-based data repair to replace these poor quality data segments with internal model-produced estimations of those measurement values. The method 100 (step 121) may also repair relatively short slices of poor quality values, gaps, frozen signals, and the like for a candidate process variable by using principal component analysis (PCA) or subspace modeling and sensor validation algorithms, which are described in U.S. Pat. No. 9,141,911 B2, which is incorporated herein by reference in its entirety.

In cases of noisy measurement values for a candidate process variable, method 100 (step 121) may improve data distribution by applying non-phase-shift filtering to data smooth (de-trend, resample, up-sample, down sample, and such) portions of the measurement data containing drafting or the noisy values for synchronization. The method 100 (step 121) may resample or down/up-sample measurement values for the candidate process variable with values taken from snapshots or calculated averages of the measurement values, or up/down-sample measurement values for the candidate oil well variable with interpolated values. The method 100 (step 121) may also prepare the measurement data with pre-processing options, such as by re-sampling the measurement data for a candidate oil well variable at one sample-per-minute to one sample-per-hour using a "Centre-average" or "filter-smoothen" technique.

In some embodiments, the method 100, at step 122, may scale the data measurements from the dataset. In example embodiments, method 100 (step 122) may use standard statistical approach to calculate means, medians, standard deviations (STDs) from each sensor measurement time series and then use them to re-scale each time series.

Perform Input Feature Enrichment

The method 100, at step 123, then performs input feature enrichment on the cleansed input dataset resulting from step 121. Feature enrichment enhances the dataset by adding physically meaningful or numerically more relevant derived process variables and corresponding values. The method 100 (step 123) automatically derives feature variables and corresponding values from the measurements of candidate oil well variables in the dataset. The derived feature variable values may be more predicative of the identified at least one oil well event of the oil well than the raw measurements of candidate oil well variables in the dataset. The method 100 (step 123) may derive the feature variables and corresponding values using engineering transform equations. For example, step 123 may derive values for the feature variables by transforming the measurements of candidate oil well variables in the input dataset (e.g., computing logarithm of measurements, computing quadratic or polynomial values of a measurements, and such). For another example, step 123 may derive values for the features variables based on domain engineering knowledge-based virtual values based on measurements of candidate oil well variables in the input dataset (e.g., computing a pressure difference between two specific locations of an oil well). For further example, step 123 may derive values for the feature variables by computing statistical measurements based on the measurements of candidate process variables in the input dataset (e.g., calculating a moving average value (MVA), estimating derivatives or rate of change, standard deviation over a time window (STD), moving standard deviation (MVSTD), moving changing rate, and such).

The method 100 (step 123) adds the derived features values to the dataset (from step 110) to generate an enriched dataset. The size of the input dataset is temporally increased by adding the enriched values for the feature variables. However, the enrichment of the input space (input dataset) by adding the feature variables' values are proven helpful in building an oil well model for estimating wax deposition status of the oil well.

In some embodiments the method 100 (step 124) further cleans the enriched dataset by using the same techniques as step 121. The method 100 (step 125) also scale the enriched dataset by a standard statistical algorithm used in step 122.
Perform State Identification The method 100, at step 130, performs state identification. Beginning at step 131, the method performs data clustering on the enriched/cleansed/scaled dataset resulting from step 120 to help identify normal operation data clusters and anomalous data clusters from the dataset. The embodiments, for example, may use one of artificial intelligence (AI) and machine learning (ML) unsupervised clustering algorithms, such as K-means clustering algorithm, Density-Based Spatial Clustering of Applications with Noise (DBSCAN) algorithm, or Local Outlier Factor (LOF) algorithm, etc. to calculate and label data clusters based on key sensors. For example, the method 100 (step 131) may use two default key sensor variables (based on domain knowledge), such as production tubing (263) temperature and temperature difference between the lift gas casing (233) temperature and the production tubing (263) temperature, as key variables for data clustering.

The method 100, at step 131-1, first filters sensors and selects the most representative sensors for data clustering. The embodiments, for example, may select only a few key sensors to join data clustering, and step 131-1 may filter out less important sensors based on engineering domain knowledge from the measurements of candidate oil well variables in the input dataset. After step 131-1, the selected sensors are a reduced list of sensors from the original set, which facilitates data clustering.

The method 100 (step 131-2) clusters the reduced dataset (from step 131-1) with one or more machine learning (ML) unsupervised clustering algorithms. For example, step 131-2 may use centroid-based K-means algorithm, or connectedness-based Density-Based Spatial Clustering of Applications with Noise (DB SCAN) algorithm, or Local Outlier Factor (LOF) algorithm, or other known algorithms to calculate and label data clusters based on key sensors.

After applying one or more data clustering algorithms (step 131-2), the dataset is separated and labeled as one or more data clusters. The method 100, at step 131-3, identifies data clusters associated with "normal" operating conditions. Data samples within those "normal" clusters are labeled as "normal operation condition data," and a status flag value "0" is assigned to those data samples. An important assumption here is that an oil well is most of the time operating under normal conditions.

The method 100 (step 131-4) filters out data clusters that do not meet criteria defined for "normal" operation conditions. As a result, a sub-dataset is created at step 131-4 as "normal" operation data and saved for model training in a later step.

To improve the model's accuracy and robustness, the method 100 (step 132) may remove highly correlated sensors. The method 100 generates an input correlation matrix between sensor variables by calculating Pearson product-moment correlation coefficients between each pair of sensors (step 132-1). Examples of pairs of sensors used in step 132-1 are lift gas casing (233) temperature vs production tubing (263) temperature, lift gas casing (233) pressure vs production tubing (263) pressure, and such. The method 100 (step 132-2) obtains the absolute values of the correlation coefficients between each pair of input sensor variables. At each iteration loop, for sensor(i) (where i=1, . . . ,N, and N is the total number of sensors), sum up correlation coefficients across all other sensors (for j≠i). Sensors with a sum of absolute correlation coefficients greater than or equal to a threshold (e.g., ε=0.6) are considered highly correlated. For sensors that are highly correlated, the method 100 (step 132-4) selects only one sensor for inputs and removes (step 132-3) those sensors that are high correlated to the selected one. The selected sensor is the one with the minimum sum of absolute correlation coefficients across all sensors. The selected sensor is added to the list of least correlated sensors (obtained from previous iterations).

The method 100 (step 133) then determines normal data ranges and events. The largest cluster (from step 131) is considered to correspond to normal operating conditions. The method 100 (step 133-1) takes remaining clusters (those from step 131-3 which were not identified corresponding to normal operating conditions) and assumes those to be other states for model fitting and determination of optimal time ranges. From the remaining clusters (those from step 131-3 which were not identified corresponding to normal operating conditions), data ranges that are longer than a minimum duration (this depends on the user-defined value of "state identification—minimum duration of significant events" setting from step 113) are considered potential events. With the normal data and the potential events, a partial least squares (PLS) (also referred to as Projection-to-Latent-Structure) model is built at step 133-2 using A principal components, where A is the minimum between 10 and the remaining number of sensors. The X data (i.e., known input variables) is the sensors' time series data, while the Y data (i.e., output variable to predict) is equal to "0" during normal conditions, and equal to "1" during potential events. The method 100 (step 133-3) uses PLS model prediction and user-specified value for "state identification—probability threshold for normal behavior" to identify normal behavior, user-specified value for "state identification—probability threshold for abnormal behavior (events)" to identify events. For example, data ranges where the PLS model prediction is equal to or less than pre-specified value for "state identification—probability threshold for normal behavior" threshold are considered normal, and data ranges longer than a minimum duration (e.g., more than 2 days according to a default setting based on field practice) where the PLS model prediction is equal to or greater than pre-specified value for "state identification—probability threshold for abnormal behavior (events)" threshold are considered events. Data ranges that do not fall in these two categories are classified as "unknown" and in step 133-4 they can be assigned to the onset of an event under certain conditions. The method 100 (step 133-4) fine tunes the duration of events and "unknown" data ranges (from step 133-3). When there are two or more contiguous date ranges of the same type ("normal", "event", "unknown"), they are merged into a single data range. When there are "unknown" data ranges before an event, then the "unknown" data range is merged with the event; however, if the duration of the event due to this merger exceeds the user-specified value for the "state identification—maximum duration for the onset of an event" setting (from step 113), then the "unknown" data range is split before the merger in order for the event duration to not exceed the maximum user-specified value after the merge.

Build Oil Well Model/Training Process

The method 100 (step 140) builds the oil well model using the cleaned and enriched sensor dataset (generated in step 120) and the normal data ranges and events (determined in step 130) as training dataset. The method 100 (step 140) executes the model building in one or more iterations. The model structure can be a PLS model, a partial least squares-discriminant analysis (PLS-DA) model, or a neural network model. At each iteration, the method 100 (step 141) randomly splits the dataset into a training dataset and a testing dataset, performs feature selection (step 142), builds a model on the training dataset (step 143), runs the new model on the testing dataset (step 144), evaluates the model quality with model prediction errors (step 145), and finally checks if an iteration termination criterion is satisfied (step 146) to finish iterations. Once an iteration criterion is met, the method 100 stops iterations and stores the trained model (agent) at step 147.

Further details of an agent training process are described in US Patent Publication No. 2019/0188584 A1, which is incorporated herein by reference in its entirety.

Deploy Oil Well Model

The method 100, at step 150, deploys the oil well model (i.e., oil well Agent), preferably online, for monitoring, preferably continuous monitoring, of the oil well to monitor/estimate current wax deposition status and probability for an event. The method 100 (step 150) receives real-time measurements from oil well sensors, which are fed into the oil well model. The real-time measurements are data pertaining to real-world operation of an oil well. One of skill in the art appreciates that there can be a bit of a lag (e.g., resulting from signal transmission time and/or signal processing). The term "real time" is not intended to exclude this operational lag.

From the real-time measurements, the oil well Agent first cleans, scales and enriches the dataset, then it applies the PLS model coefficients (determined during the Agent training process) to the corresponding sensors to generate current estimates of the wax deposition or oil well health status, in a format of continuous key performance indicators (KPIs) used as indicators of the oil well model (identified in step 130) over time. The generated KPIs from the oil well model are very important and helpful for a user (e.g., oil well operator, maintenance engineer) or oil field system to monitor and optimize the operations of the oil well production at a safe and optimal operation condition. For example, the plant user or system may use the KPIs to indicate current or future situations of wax buildup. The generated KPIs may be further used to perform optimization on maintenance planning and sustained oil well production.

Application Example

Figure 2F:
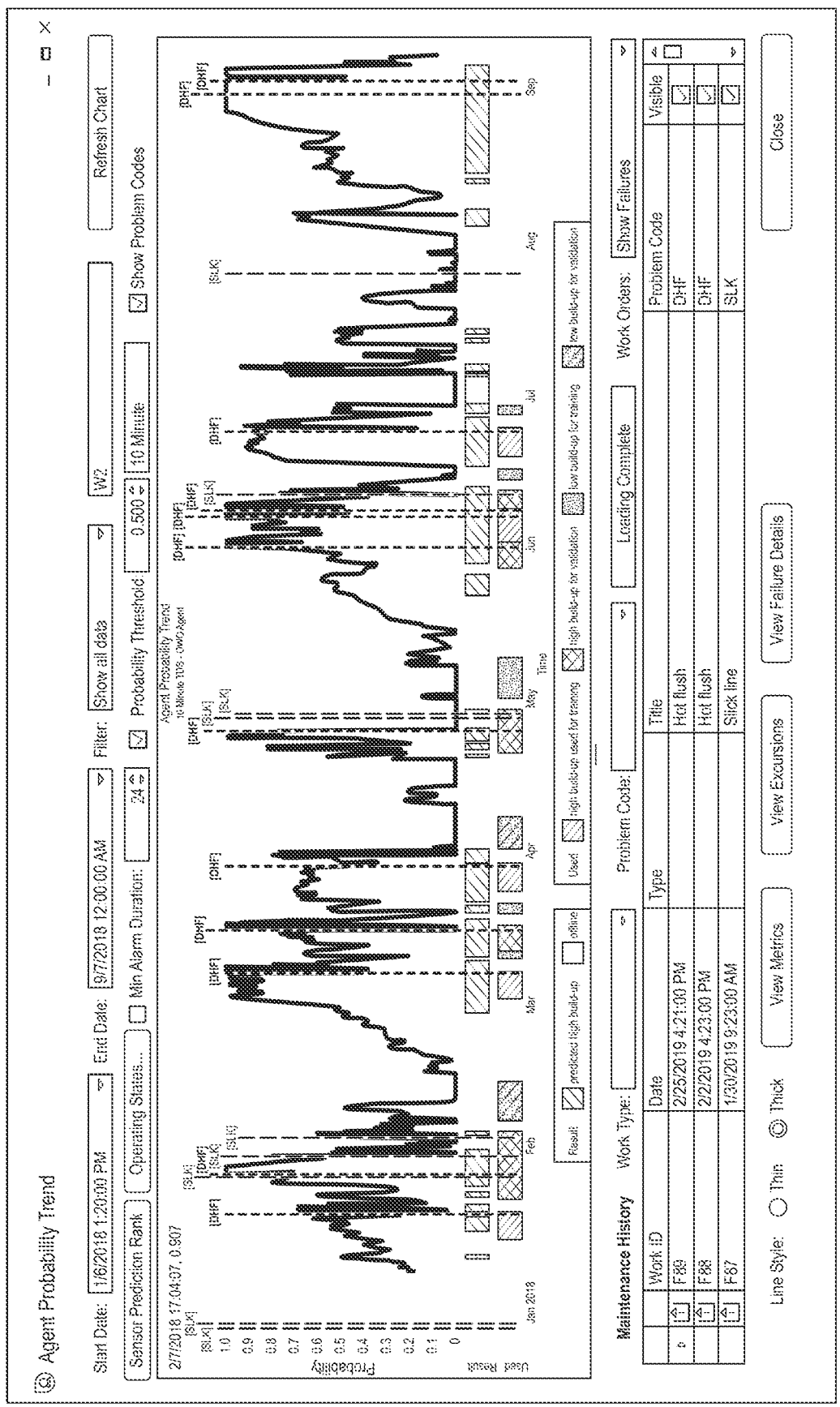
FIG. 2F illustrates an example of a trained oil well model and its estimate of oil well wax deposition in the method of FIG. 1A.

FIG. 2F illustrates a detailed example of data charts depicting the oil well model training and validation using training data and testing data, respectively. Prior to collection of the plotted data of FIG. 2F, an application of method 100 loads one or more set of oil well historical sensor measurement data from an oil well operation historian (step 110 of method 100) by performing data preprocessing (step 120 of method 100). The oil well historical sensor measurement data can include one or more of lift gas flow rate, lift gas casing (233) pressure, lift gas casing (233) temperature, production tubing (263) pressure, production tubing (263) temperature, and inner annulus pressure. The application then determines normal data ranges and events (step 130 of method 100) by identifying data clusters, removing highly correlated sensors, and using PLS model predictions and user-specified thresholds. The application then builds an oil well Agent using the pre-processed data and normal data ranges and events generated in steps 120-130 as training and validation inputs for a PLS model (step 140 of method 100).

FIG. 2F illustrates an example of the predictions of known events using the oil well model, where the vertical dot-lines represent historical events used for training and the vertical dash-lines represent historical events used for testing (model validation). The x-axis is the time domain, and the y-axis is a probability value. At the top of the vertical dashed lines are event codes that indicate the nature of the event, such as diesel hot flush (DHF) or slick line (SLK). These events are also indicated in the table of FIG. 2F. The curve-line is the model results, which estimates the degree of wax and hydrate buildup. Data points closer to y-axis value of zero indicate low levels of buildup of wax and hydrate; in other words, the oil well is clean. Data points closer to a y-axis value of 1 indicate high buildup of wax and hydrate; in other words, the oil well is clogged.

Correlation of an increase of the curve-line (estimated buildup) with actual, historical event cleaning (dashed lines) demonstrates that the built oil well model is able to predict known events well with the enriched and selected inputs.

Along the x-axis and below the chart, there are two rows of bars. The top row of bars indicates predicted high build-up scenarios (output from oil well Agent execution from step 150). The bottom row indicates the status identified by method 100 at step 130 where data corresponds to high or low buildup scenarios, as well as to whether they correspond to training or testing datasets (determined by method 100 at steps 130 and 140).

Network Environment for Building and Deploying Oil Well Models

Figure 3:
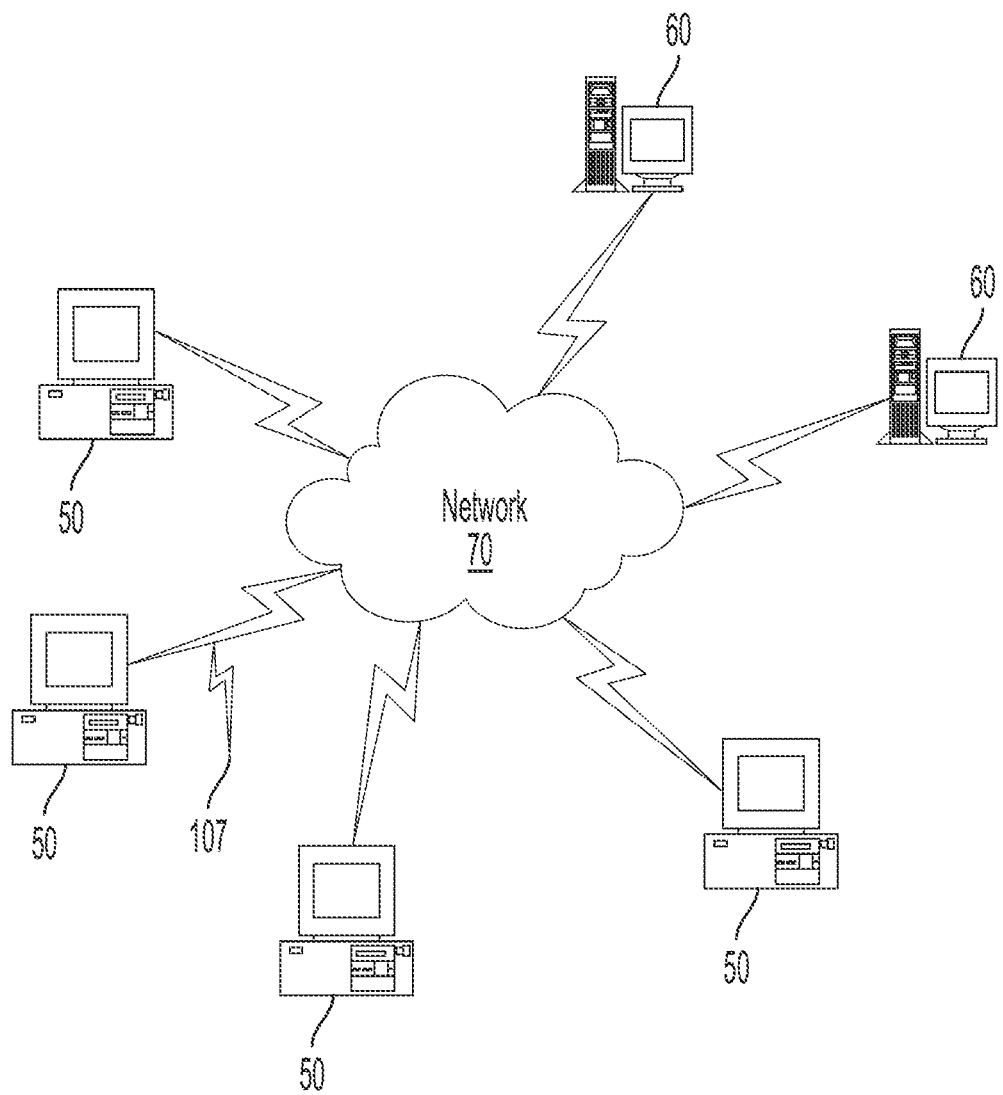
FIG. 3 is a schematic diagram of an example computer network environment in which embodiments of the invention may be implemented.

FIG. 3 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate 107 with one another. Other electronic device/computer network architectures are suitable.

Figure 4:
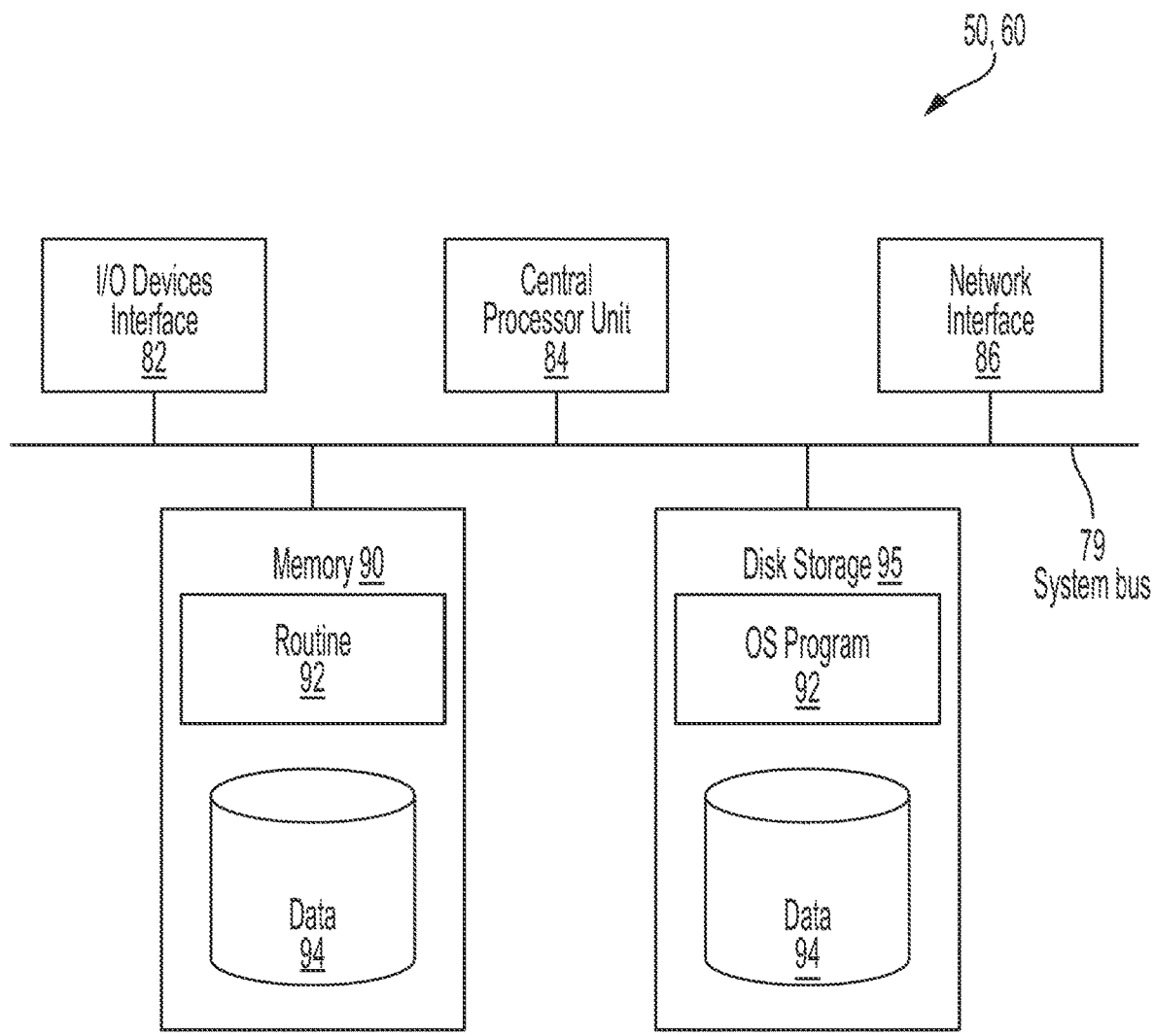
FIG. 4 is a block diagram of a computer node in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., data processing and Oil well model building and deploying in the processes of FIGS. 1A-1H, user interface implementation, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

Incorporation by Reference; Equivalents

The teachings of all patents, published applications and references cited herein are incorporated by reference in their entirety.

It should be understood that in other embodiments the present invention may be used in a wide variety of other types of equipment, or technological processes in the useful arts.

While this invention has been particularly shown and described with references to example embodiments thereof, it will be understood by those skilled in the art that various changes in form and details may be made therein without departing from the scope of the invention and embodiments encompassed by the appended claims.

REFERENCES

[1] Sousa A. L., H. A. Matos, L. P. Guerreiro, Preventing and removing wax deposition inside vertical wells: a review, *Journal of Petroleum Exploration and Production Technology* (2019) 9:2091-2107

[2] Venkat Venkatasubramanian, The Promise of Artificial Intelligence in Chemical Engineering: Is It Here, Finally?" *AIChE Journal*, Vol.65-2, 467-479

What is claimed is:

1. A computer-implemented method for estimating wax or hydrate deposition in an oil well, the method comprising:
   generating a dataset by loading one or more sets of oil well historical sensor measurement data, each set of oil well historical sensor measurement data comprising measurements related to an attribute of the oil well, and one or more sets of oil well historical event data, each set of oil well historical event data comprising date and time duration related to events of the oil well;
   cleansing the generated dataset by identifying and removing measurements that are invalid in quality for modeling wax or hydrate deposition in the oil well;
   enriching the cleansed dataset by deriving one or more feature variables and corresponding values based on measurements of oil well sensor variables, whereby enriching adds the values of the one or more derived feature variables to the cleansed dataset;
   identifying groups of highly correlated inputs by performing cross-correlation analysis on the enriched dataset, each identified group of highly correlated inputs comprising one or more of: measurements of a subset of the sensor variables and values of derived feature variables in the cleansed and enriched dataset;
   performing feature selection using one representative input from each identified group of highly correlated inputs and outputting results to a sub-dataset;
   identifying and labeling data clusters using a machine learning unsupervised data clustering algorithm, thereby generating a dataset containing normal data ranges and events data for model building;
   removing highly correlated sensors for oil well operation state identification;
   determining normal data ranges and state conditions from clustered data;
   building partial least square (PLS) models for operation state identification;
   identifying and labeling events from the built PLS models and thresholds;

iteratively splitting the dataset into a training dataset and a testing dataset, building and training an oil well model using the training sub-dataset, evaluating quality of the model using the testing sub-dataset, and storing the model when a termination criterion is met;

executing the built and trained oil well model to estimate wax or hydrate deposition in the oil well based on real-time oil sensor data.

2. The computer-implemented method of claim 1, wherein the oil well historical sensor measurement data comprises lift gas flow rate, lift gas casing pressure, lift gas casing temperature, production tubing pressure, production tubing temperature, or inner annulus pressure.

3. The computer-implemented method of claim 1, wherein the oil well historical event data comprises one or more of diesel hot flush, slick line, and coil tubbing.

4. The computer-implemented method of claim 1, wherein loading further comprises loading one or more user-specified settings.

5. The computer-implemented method of claim 1, further comprising scaling the generated data, wherein scaling is performed after cleansing and prior to enriching.

6. The computer-implemented method of claim 1, wherein the machine learning unsupervised data clustering algorithm comprises a K-means algorithm, a Density-Based Spatial Clustering of Applications with Noise (DBSCAN) algorithm, or a Local Outlier Factor (LOF) algorithm.

7. The computer-implemented method of claim 1, wherein removing highly correlated sensors for oil well operation state identification further comprises calculating Pearson product-moment correlation coefficients between sensors.

8. The computer-implemented method of claim 7, wherein removing highly correlated sensors for oil well operation state identification further comprises summing coefficients across all other sensors and comparing with a pre-defined threshold value.

9. The computer-implemented method of claim 7, wherein removing highly correlated sensors for oil well operation state identification further comprises removing the sensors with highest summed absolute values of correlation coefficients.

10. The computer-implemented method of claim 7, wherein removing highly correlated sensors for oil well operation state identification further comprises keeping remaining sensors with least correlations.

11. The computer-implemented method of claim 1, wherein determining normal data ranges and state conditions from clustered data further comprises deriving time ranges and state conditions from clustered data and thresholds.

12. The computer-implemented method of claim 1, wherein determining normal data ranges and state conditions from clustered data further comprises a fine-tuning duration of state conditions and events.

13. The computer-implemented method of claim 1, wherein splitting the dataset into a training dataset and a testing dataset according the data ranges and events data further comprises assigning model output value as "0" for normal operation condition and as "1" during potential events.

14. The computer-implemented method of claim 1, wherein executing the built and trained oil well model and estimating wax or hydrate deposition status in the oil well based on real-time oil sensor data further comprises reading real-time sensor data, cleaning, scaling, and enriching the real-time sensor data, executing PLS model online calculations and sending output values to a user interface.

15. The computer-implemented method of claim 1, wherein the built and trained oil well model adjusts operation of the oil well.

16. A computer system for estimating wax or hydrate deposition in an oil well, the computer system comprising:
a processor; and
a memory with computer code instructions stored thereon, the processor and the memory, with the computer code instructions, being configured to cause the system to:
generate a dataset by loading one or more sets of oil well historical sensor measurement data, each set of oil well historical sensor measurement data comprising measurements related to an attribute of the oil well, and one or more sets of oil well historical event data, each set of oil well historical event data comprising date and time duration related to events of the oil well;
cleanse the generated dataset by identifying and removing measurements that are invalid in quality for modeling wax or hydrate deposition in the oil well;
enrich the cleansed dataset by deriving one or more feature variables and corresponding values based on measurements of oil well sensor variables, whereby enriching adds the values of the one or more derived feature variables to the cleansed dataset;
identify groups of highly correlated inputs by performing cross-correlation analysis on the enriched dataset, each identified group of highly correlated inputs comprising one or more of: measurements of a subset of the sensor variables and values of derived feature variables in the cleansed and enriched dataset;
perform feature selection using one representative input from each identified group of highly correlated inputs and outputting results to a sub-dataset;
identify and label data clusters using a machine learning unsupervised data clustering algorithm, thereby generating a dataset containing normal data ranges and events data for model building;
remove highly correlated sensors for oil well operation state identification;
determine normal data ranges and state conditions from clustered data;
build partial least square (PLS) models for operation state identification;
identify and label events from the built PLS models and thresholds;
iteratively split the dataset into a training dataset and a testing dataset, build and train an oil well model using the training sub-dataset, evaluate quality of the model using testing sub-dataset, and store the model when a termination criterion is met;
execute the built and trained oil well model to estimate wax or hydrate deposition in the oil well based on real-time oil sensor data.

17. A non-transitory computer program product for estimating wax or hydrate deposition in an oil well, the computer program product comprising a computer-readable medium with computer code instructions stored thereon, the computer code instructions being configured, when executed by a processor, to cause an apparatus associated with the processor to:
generate a dataset by loading one or more sets of oil well historical sensor measurement data, each set of oil well historical sensor measurement data comprising measurements related to an attribute of the oil well, and one or more sets of oil well historical event data, each set of oil well historical event data comprising date and time duration related to events of the oil well;

cleanse the generated dataset by identifying and removing measurements that are invalid in quality for modeling wax or hydrate deposition in the oil well;

enrich the cleansed dataset by deriving one or more feature variables and corresponding values based on measurements of oil well sensor variables, whereby enriching adds the values of the one or more derived feature variables to the cleansed dataset;

identify groups of highly correlated inputs by performing cross-correlation analysis on the enriched dataset, each identified group of highly correlated inputs comprising one or more of: measurements of a subset of the sensor variables and values of derived feature variables in the cleansed and enriched dataset;

perform feature selection using one representative input from each identified group of highly correlated inputs and outputting results to a sub-dataset;

identify and label data clusters using a machine learning unsupervised data clustering algorithm, thereby generating a dataset containing normal data ranges and events data for model building;

remove highly correlated sensors for oil well operation state identification;

determine normal data ranges and state conditions from clustered data;

build partial least square (PLS) models for operation state identification;

identify and label events from the built PLS models and thresholds;

iteratively split the dataset into a training dataset and a testing dataset, build and train an oil well model using the training sub-dataset, evaluate quality of the model using testing sub-dataset, and store the model when a termination criterion is met;

execute the built and trained oil well model to estimate wax or hydrate deposition in the oil well based on real-time oil sensor data.

\* \* \* \* \*